United States Patent
Josse et al.

(10) Patent No.: US 6,531,058 B1
(45) Date of Patent: Mar. 11, 2003

(54) BIOLOGICAL FLUIDIZED BED APPARATUS

(76) Inventors: Juan Carlos Josse, 34648 Via Catalina, Capistrano Beach, CA (US) 92624; John William Sutherlin, 3332 Grande Rte. St. John St., New Orleans, LA (US) 70119

( * ) Notice: Subject to any disclaimer, the term of this patent is extended or adjusted under 35 U.S.C. 154(b) by 0 days.

(21) Appl. No.: 09/839,653

(22) Filed: May 13, 2002

(51) Int. Cl.[7] .............................................. B01D 33/70
(52) U.S. Cl. .................... 210/151; 210/188; 210/195.3; 210/262; 210/617
(58) Field of Search ................................ 210/150, 151, 210/188, 194, 195.1, 195.3, 197, 617, 258, 259, 262, 256

(56) References Cited

U.S. PATENT DOCUMENTS

| | | | | |
|---|---|---|---|---|
| 4,482,458 A | * | 11/1984 | Rovel et al. ................ | 210/617 |
| 4,707,252 A | * | 11/1987 | Durot et al. ................ | 210/151 |
| 5,116,505 A | * | 5/1992 | Lourens et al. ............. | 210/617 |
| 5,441,634 A | * | 8/1995 | Edwards .................... | 210/195.3 |
| 5,472,611 A | * | 12/1995 | Jönsson ...................... | 210/150 |
| 5,993,650 A | * | 11/1999 | Kim ........................... | 210/150 |
| 6,103,109 A | * | 8/2000 | Noyes et al. ............... | 210/195.1 |
| 6,159,365 A | * | 12/2000 | Kigel et al. ................. | 210/151 |

* cited by examiner

*Primary Examiner*—Christopher Upton
(74) *Attorney, Agent, or Firm*—Mark A. Taylor; Stoll, Keenan & Park, LLP (57) ABSTRACT

A pre-fabricated, self-contained biological fluidized bed apparatus for the treatment of wastewater, which offers easy and uniform expansion for various types of commercially available media, by means of a conical bottom and a single, non-clogging flow distribution pipe. Besides the biological treatment accomplished within the fluidized bed, this reactor provides mechanical solids/gas/liquid separation and upflow sludge blanket clarification to improve effluent quality. Additional unique features of this apparatus are a rotating surface skimmer and an excess sludge collection and thickening device powered by an externally mounted drive. With this reactor configuration, anaerobic and anoxic biological treatment and subsequent clarification are achieved in a single enclosed tank.

1 Claim, 9 Drawing Sheets

BIOLOGICAL FLUIDIZED BED APPARATUS

1. BACKGROUND OF THE INVENTION

1.1 Field of the Invention

The invention pertains to a specific design of a biological fluidized bed apparatus to treat wastewater. The invention claimed here is the particular design of the apparatus and its components.

1.2 Description of the Prior Art

Over the last twenty years, extensive research has been done in the US, Europe and Japan to develop various fluidized bed reactor configurations and processes. Important patented contributions in this field have been made by the following:

Rovel et al. (pat: U.S. Pat. No. 4,482,458)
Vogelpohl et al. (pat: U.S. Pat. No. 4,940,546)
Edwards (pat: U.S. Pat. No. 5,441,634)
Yoda et al. (pat: U.S. Pat. No. 4,762,612)
Clark et al. (pat: U.S. Pat. No. 5,942,116)
Love (pat: U.S. Pat. No. 4,530,762)
Klein (pat: U.S. Pat. No. 5,573,671)

Biological fluidized bed reactors have been widely used to remove dissolved and suspended organic matter from high-strength industrial effluents. In this application, the biological beds are comprised of anaerobic bacteria. Anoxic fluidized bed reactors have also been used for the removal of nitrate from industrial and municipal effluents, in which case the biological bed is comprised of denitrifying bacteria.

In the anaerobic application, these reactors convert dissolved and suspended organic matter into methane and carbon dioxide (biogas). The conversion is accomplished by anaerobic bacteria, which grow attached as biofilm to inert media particles in the fluidized bed. The reduction of organic matter in the treated waste is the result of a combination of physical retention of suspended and colloidal organic matter by solids contact flocculation within the biological bed, hydrolysis of the trapped solids by hydrolyzing bacteria present in the anaerobic consortium, and finally biological conversion of dissolved organic matter into biogas by acetogenic and then methanogenic bacteria.

In the anoxic application, these reactors convert nitrate into nitrogen gas. The conversion of nitrate to nitrogen gas is accomplished by denitrifying bacteria that grow attached to inert media particles in the fluidized bed. These heterotrophic bacteria are ubiquitous in most natural waters. In the process of denitrification, nitrate acts as an electron acceptor and an organic substrate as a reduced electron donor. The substrate used as an electron donor and a source of carbon is a readily degradable organic substrate (i.e., methanol, sugars or acetic acid), which is supplemented to the anoxic reactor.

The fluidized bed reactors in use are an attached biofilm fluidized bed process that is based on the concept that large biomass concentrations can be achieved on a large surface area by dense biofilm attachment to an inert small particle size carrier. A large surface area is created by small inert particles in a bed, fluidized by upward flow. The intense mixing occurring in the bed minimizes diffusion limitations and eliminates clogging and short-circuiting problems. These reactors accumulate large amounts of active biomass, and can achieve very long cell detention times. Existing fluidized bed reactors consist of a cylindrical column with flat bottom. These columns contain a bed of small inert particles, 0.4–1.0 mm zeolite, diatomaceous earth, or activated carbon particles. The bed is fluidized by the upward flow through the column of untreated wastewater mixed with recirculated effluent. In existing reactors, the upward flow necessary to achieve bed fluidization is distributed by means of various nozzles or small diameter pipes placed at the bottom of the column. Anaerobic biofilm develops on the inert media and the physical attachment of anaerobic bacteria to the media surface prevents biomass washout. The high fluid shear force resistance of biofilms allows these reactors to be operated at upflow velocities which would otherwise wash out unattached biomass.

Upflow velocities are set by the recirculation flow, according to the fluidization properties of the bio-particles (e.g., inert particles with attached bacterial film). The upflow velocities are sufficient to reach bed expansions as to allow free release of generated gas bubbles. The degree of bed expansion is achieved by controlling the recirculation flow rate of a portion of the effluent in a closed-loop.

Under some conditions the turbulent flow exerts sufficient shear to prevent the development of thick biofilms on the media, which limit mass transfer. The high surface-to-volume ratio of the bulk of the bed inert media (300 to 2500 $ft^2/ft^3$) creates a vast area for the development of microbial biofilm. Approximately 95 percent of the active biomass in a well-operated fluidized bed reactor is attached growth. This fact enables the development of dense but thin biofilms that lead to high concentrations of attached biomass in the bed.

Despite the great advantages that this process offers in terms of high organic loading rates, short hydraulic retention times and low excess solids generation, the use of these reactors has not been extensive due to various design limitations. The most common problems reported in full-scale applications and their effects on operation and effluent quality are:

(a) Inadequate Flow Distribution at the Bottom of the Bed

In current fluidized bed reactor configurations, clogging of distribution nozzles and the existence of "dead zones," channeling and short-circuiting inside the bed are major disadvantages. Good flow distribution is necessary to achieve uniform and controlled bed expansion and a well-mixed flow pattern inside the bed. Such patterns promote turbulence at the biofilm/liquid interface and enable all the attached biomass to be in contact with the waste.

When a uniform expansion of the bed is obtained, biogas bubbles generated in the bed are evenly released. This avoids the coalescence of small bubbles into much larger bubbles that disrupt the bed as they rise. Such bed disruptions deteriorate the quality of the effluent by releasing solids trapped within the bed.

Although the solution to inadequate bed expansion would appear to be increasing the recirculation flow in order to achieve higher upflow velocity, this presents the disadvantage of washing solids trapped in the bed, by the high interstitial velocities created by the increased flow. These solids deteriorate the quality of the effluent.

(b) Need for Highly Uniform Particle Size Media in Cylindrical Reactor Configurations In cylindrical, flat bottom reactors, the inert media must have a highly uniform particle size. Typical media materials are zeolite, sand, and activated carbon. Commercially available media are not highly uniform in particle size. A more uniform particle size media has a higher cost, since narrow particle size range sieving produces more wasted material in the for the media manufacturer.

Since the upflow velocity in cylindrical reactors is constant throughout the bed, the existence of various particle sizes affects uniform expansion. Larger particles weigh more and have higher terminal settling velocities, thus, higher upflow velocities are required to keep them suspended. If there is a range in the particle size of the media, at the upflow velocity necessary to expand the large particles, the small particles are carried out of the bed, or over expanded. On the other hand, at an upflow velocity, at which small media particles reach adequate fluidization, large particles remain unexpanded at the bottom of the reactor, creating a plug and hindering uniform expansion.

(c) Inadequate Solids/Gas/Liquid Separation Within the Reactor

Before the treated effluent exits the top of the reactor, suspended solids need to be removed. The rising bubbles above the bed create a drag effect that helps carry suspended solids to the top of the reactor. Gas bubbles also tend to trap suspended solids, which are attracted by the surface tension of the bubbles. In several reactors without an appropriate incorporated solids separation system organic loadings are kept below the reactor's capacity in order to reduce gas generation as a measure to limit suspended solids concentrations in the effluent. In several reactor configurations, additional equipment such as external clarifiers is used to polish the effluent.

Many industrial and farm wastes produce a scum layer at the water surface inside the reactor. This layer of floating grease and organic material needs to be removed so that it does not accumulate or appear in the effluent. To the extent of our search and experience, no current biological fluidized bed reactor in use, presents a surface skimmer and an effluent launderer to achieve this objective.

(d) Difficulty in Removing Excess Solids from the Reactor

Anaerobic bacteria are slow growers, however as a result of substrate consumption there is biomass growth. Thus, there is a need to accumulate and store detached biomass inside the reactor and to remove it for disposal. It is important to provide sufficient solids retention time inside anaerobic reactors, in order to achieve adequate digestion of the excess solids produced. This eliminates the need for further sludge stabilization outside the reactor. However, failure to accumulate and remove excess biomass without disturbing the operation of the reactor, will affect the performance of the unit and the quality of the effluent.

2. SUMMARY

This biological fluidized bed apparatus provides a prefabricated, modular, self-contained biological reactor, which can treat municipal, industrial and confined animal feedlot wastewater at high loading rates. This reactor design overcomes the limitations and disadvantages of prior fluidized bed reactor configurations by means of its shape and internal components. As a result, it provides better quality effluent, requires less "foot print" area for installation and demands less maintenance.

This said apparatus overcomes several disadvantages of current fluidized bed reactor configurations. The improvements in this apparatus' design are:

A. Uniform flow distribution at the bottom of the bed. This is achieved using a reactor tank with a 60-degree conical bottom (inverted truncated cone) and a single internal down-coming pipe discharging recirculated flow at the bottom of the cone. In order to limit turbulence at the bottom of the reactor, the flow exits the pipe radially by means of a molded flow distribution fitting. This fitting, which changes the direction of the flow from vertical to radial, is contoured internally to reduce losses and smoothen the change of direction of the flow lines. The open area of the flow distribution fitting is such that exit velocities are sufficiently high to drag the larger bioparticles located at the bottom of the reactor. The required drag velocity is achieved at a flow sufficient to create the upflow velocity required for the minimum admissible bed expansion. The proposed flow distribution design eliminates nozzle clogging, since a single fitting is used instead of a network of multiple small diameter nozzles. With this design, no channeling or "dead zones" form in the bed. Additionally, bed expansion is uniform and can be controlled very precisely by adjusting the recirculation flow. A more uniform fluidization enables gas bubbles to be released evenly throughout the section of the bed.

B. Media with a lower particle size uniformity coefficient can be efficiently fluidized. The conical bottom reactor design allows a wider range of particle sizes in the media to be fluidized, as a result of the various upflow velocities occurring through the conical portion of the reactor. At a constant recirculation flow, upflow velocities gradually decrease from the bottom of the inverted cone through the cylindrical portion of the tank. This is a result of the change in sectional area of the conical portion. Having various upflow velocities in the lower section of the reactor accommodates the use of a wider range of particle sizes in the media. Larger, heavier particles will concentrate towards the bottom of the cone, where higher upflow velocities occur due to reduced cross-sectional area. Accordingly, smaller, lighter particles will accumulate in the upper section of the cone, which has lower upflow velocities. This feature enables the use of biofilm support media with less uniform particle size. This reduces the cost of the media since it can be purchased as a readily available commercial product.

C. Solids carry-over with the reactor effluent greatly minimized. The apparatus configuration includes an internal downflow solids/gas/liquid separator at the top of the unit. Solids carried out of the bed are forced to flow downward at high velocity along the sloped wall of the separator, into a submerged trough. The upflow velocity above the trough is extremely low, such that the solids could not be picked up from the trough. A slow-rotating paddle sweeps the trough and pushes most of the solids into two collection boxes connected to the intake of the recirculation pump. This way, most of the solids retained in the separator are forced to re-enter the bed. A portion of the separated solids is pushed into other two deeper collection boxes for accumulation, thickening and periodic wasting. Thickened solids sludge is removed from these boxes by means of electrically actuated valves, operating on timers. Additionally, the reactor includes a quiescent clarification zone, external to the separator.

Gas bubbles are isolated from the clarification zone and do not interfere with this process. The clarification zone has a gradual increase in cross-sectional area; thus, it operates as an upflow solids contact clarifier. On top of the clarification zone, an effluent trough disposed on the perimeter of the reactor collects the effluent overflow. An effluent launderer, installed along the trough, retains floating solids. A slow-rotating skimmer arm connected to the same sweeping mechanism of the submerged trough, pushes scum and floating solids on the surface of the water into a scum box. Scum and floatables collected in this box are removed by means of an electrically actuated valve. This internal solids/gas/liquid separator provides a reliable means for separation of the three phases. The separator provides an enclosed volume above the surface of the water for the accumulation and removal of biogas.

The advantages noted above and other benefits of our Biological Fluidized Bed Apparatus over prior art will become apparent from a consideration of the following descriptions and drawings.

3. DESCRIPTION OF DRAWINGS

The Biological Fluidized Bed Apparatus depicted in the figures is a modular, prefabricated reactor. Projects that require larger reactor volumes should use two or more units connected in parallel or in series, as required. For lower loading requirements, smaller modular units can be fabricated, maintaining the proportion of the dimensions presented in the drawings.

3.1 DRAWING FIGURES

The advantages noted above and other benefits of the biological fluidized bed apparatus of the present invention over the prior art will become apparent from a consideration of the following descriptions and drawings, in which:

FIGS. 6-1 and 6-2 are fabrication drawings showing detailed dimensions of the solids trough and lower portion of the solid/gas/liquid separator, and the lower body of the biological fluidized bed apparatus;

FIGS. 7-1, 7-2 and 7-3 are fabrication drawings showing the upper body of the apparatus, as well as the upper component of the solid/gas/liquid separator and effluent trough;

3.2 REFERENCE NUMERALS IN FIGURES

Figure 1:
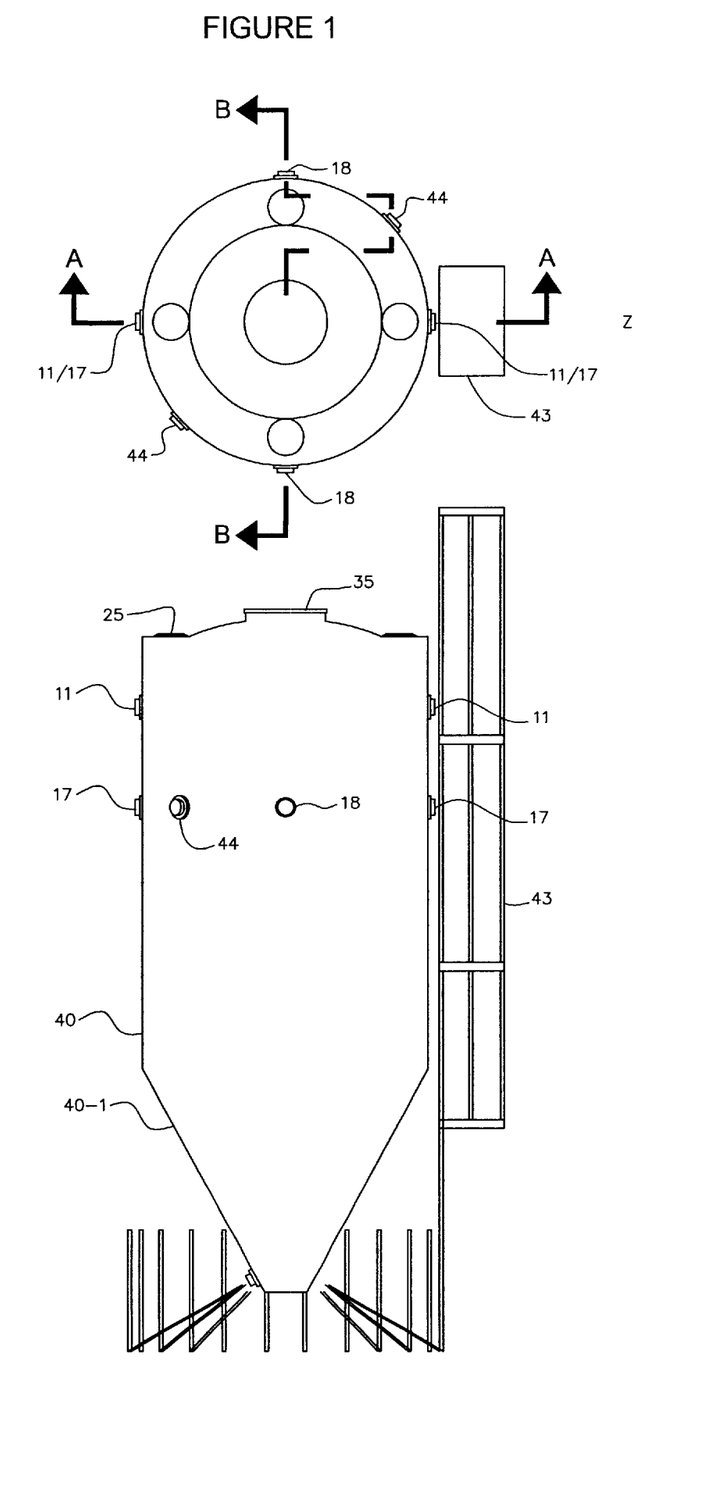
FIG. 1 is a general orientation showing shape and cutting planes for sectional views, wherein the figure shows top and side views of the biological fluidized bed apparatus with main ports.

In FIGS. 1 to 9, the reference numerals and letters represent features or dimensions as follows:

FIG. 1. Side and top views:

Cutting planes and orientation

Figure 2:
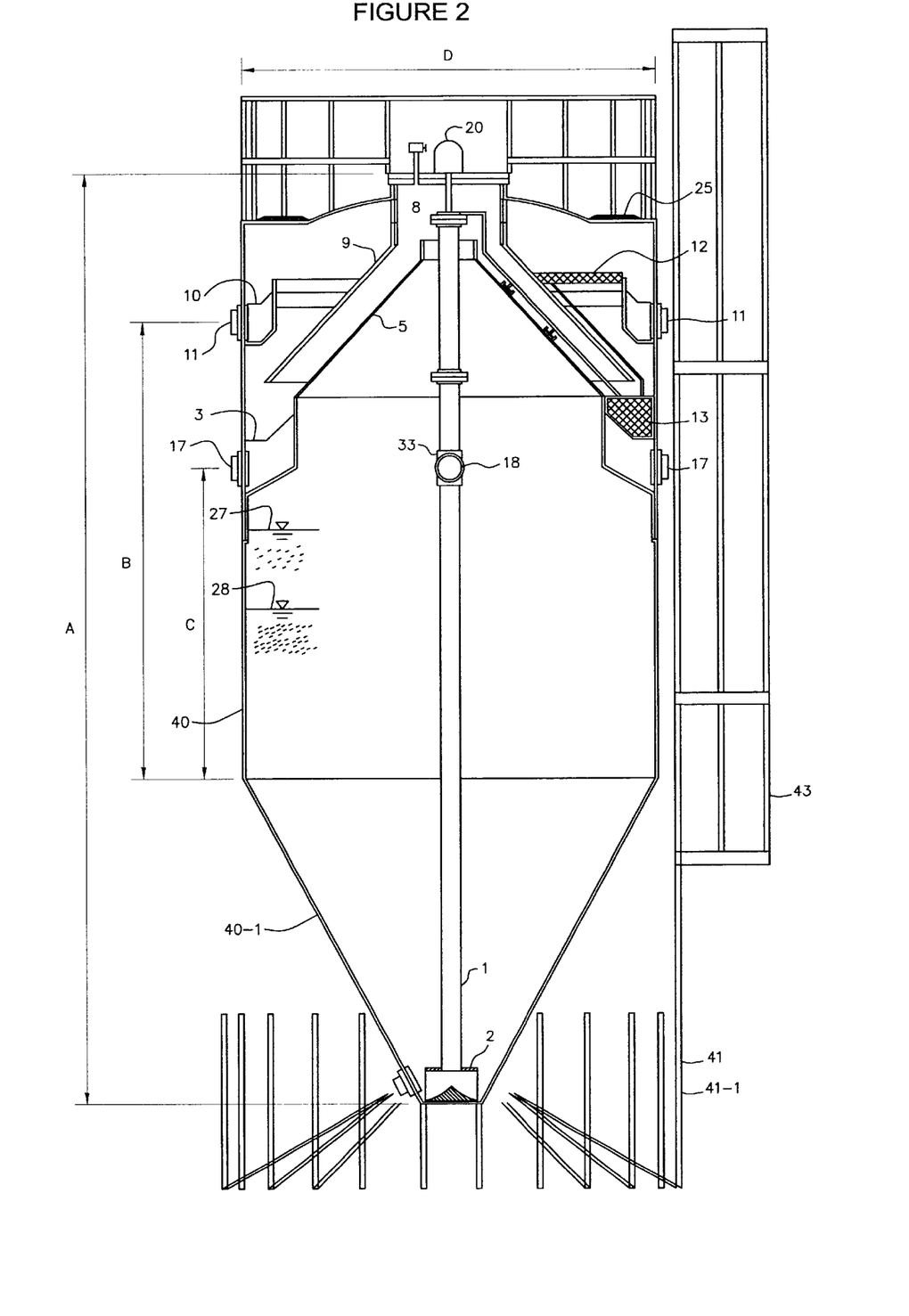
FIG. 2 shows sectional view A—A of the biological fluidized bed apparatus, including its steel stand, ladder, safety railing and external drive for the solids collection paddle and surface skimmer arm, wherein the overall external dimensions of the reactor are presented.
Figure 4:
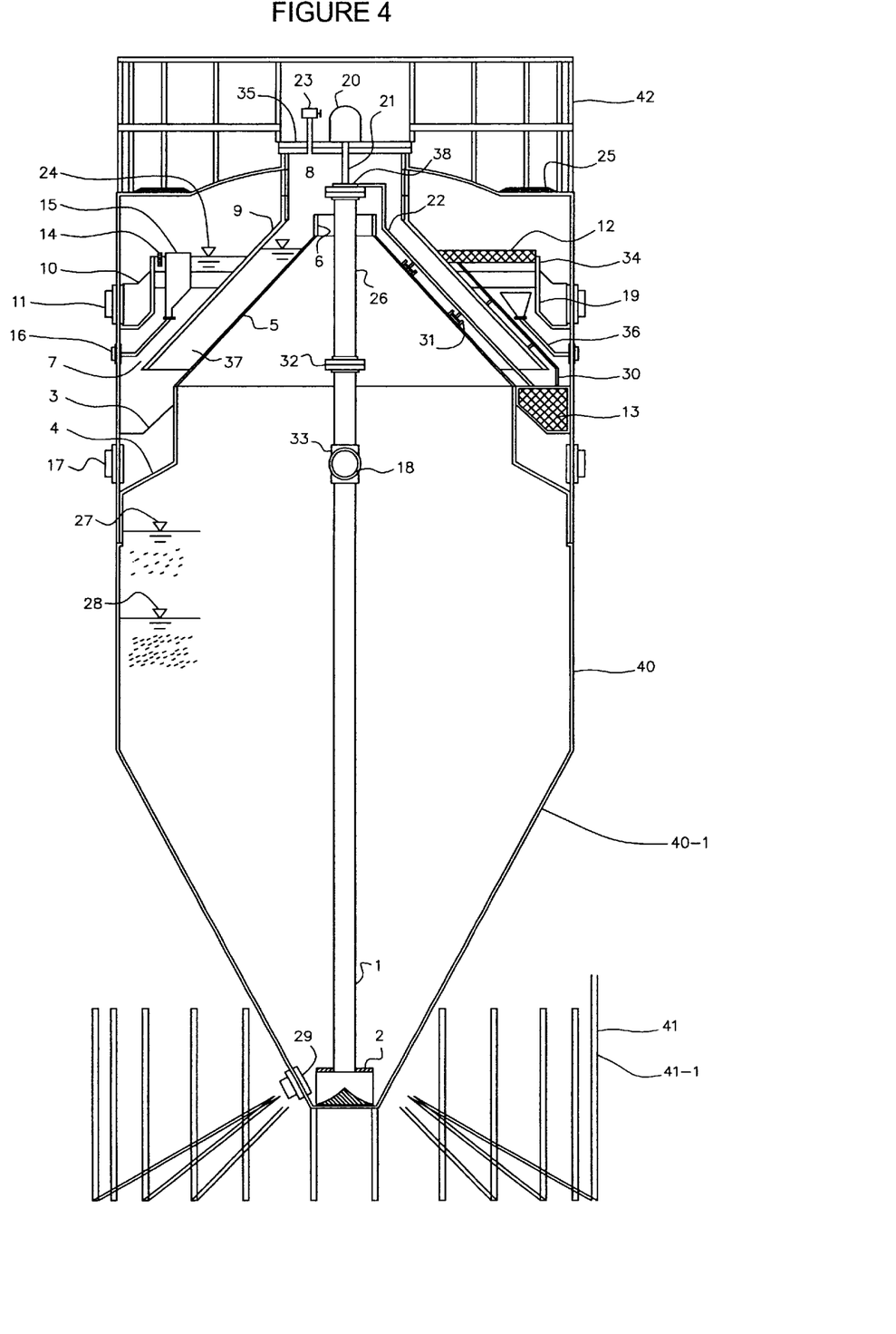
FIG. 4 shows sectional view A—A of the biological fluidized bed apparatus and labels most components.
Figure 5:
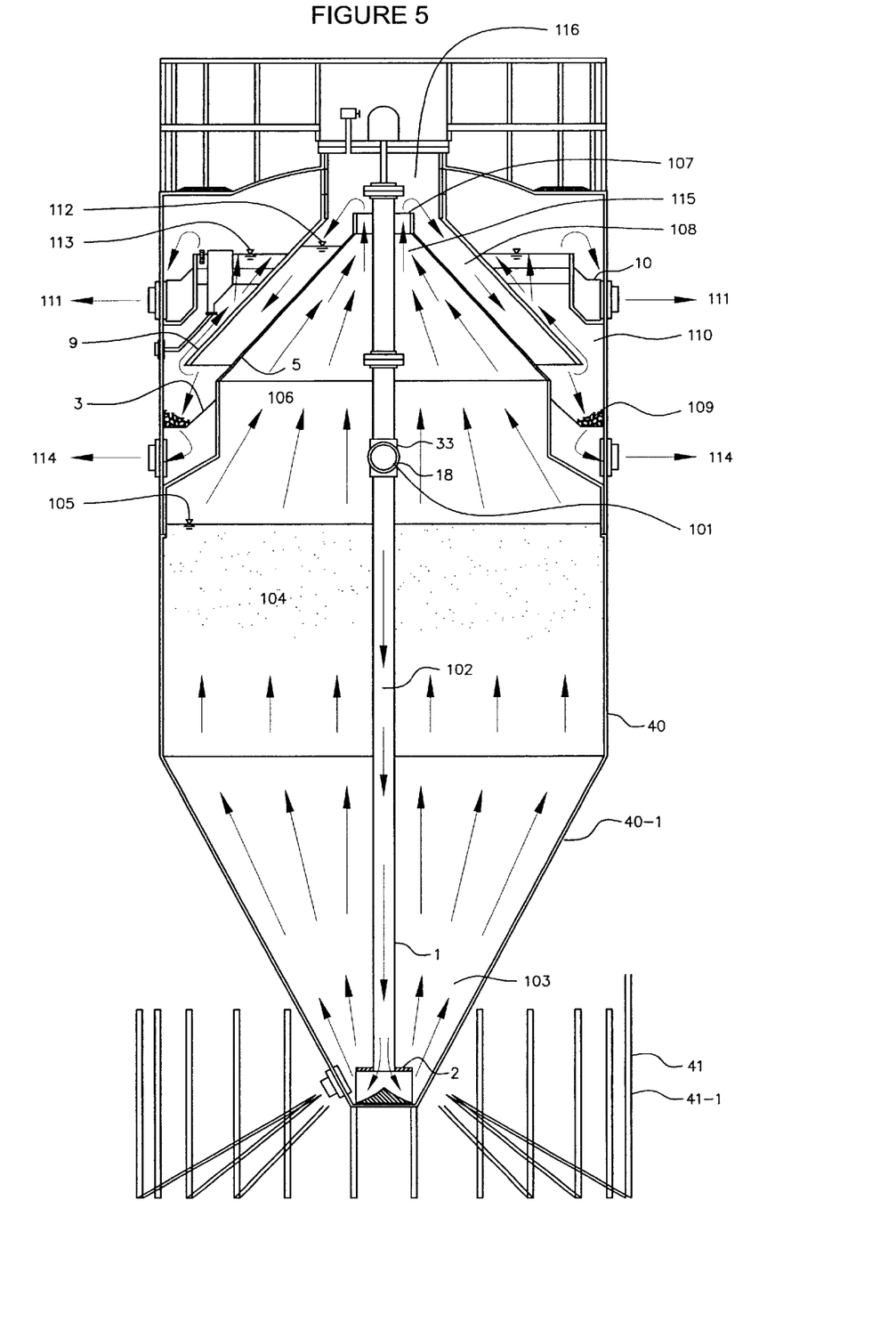
FIG. 5 shows sectional view A—A of the biological fluidized bed apparatus with a schematic representation of direction of the flow through the fluidized bed and through the solids/gas/liquid separator, wherein the operation of the unit is shown.

A-A Cutting plane used for sections in FIGS. 2, 4 and 5

Figure 3:
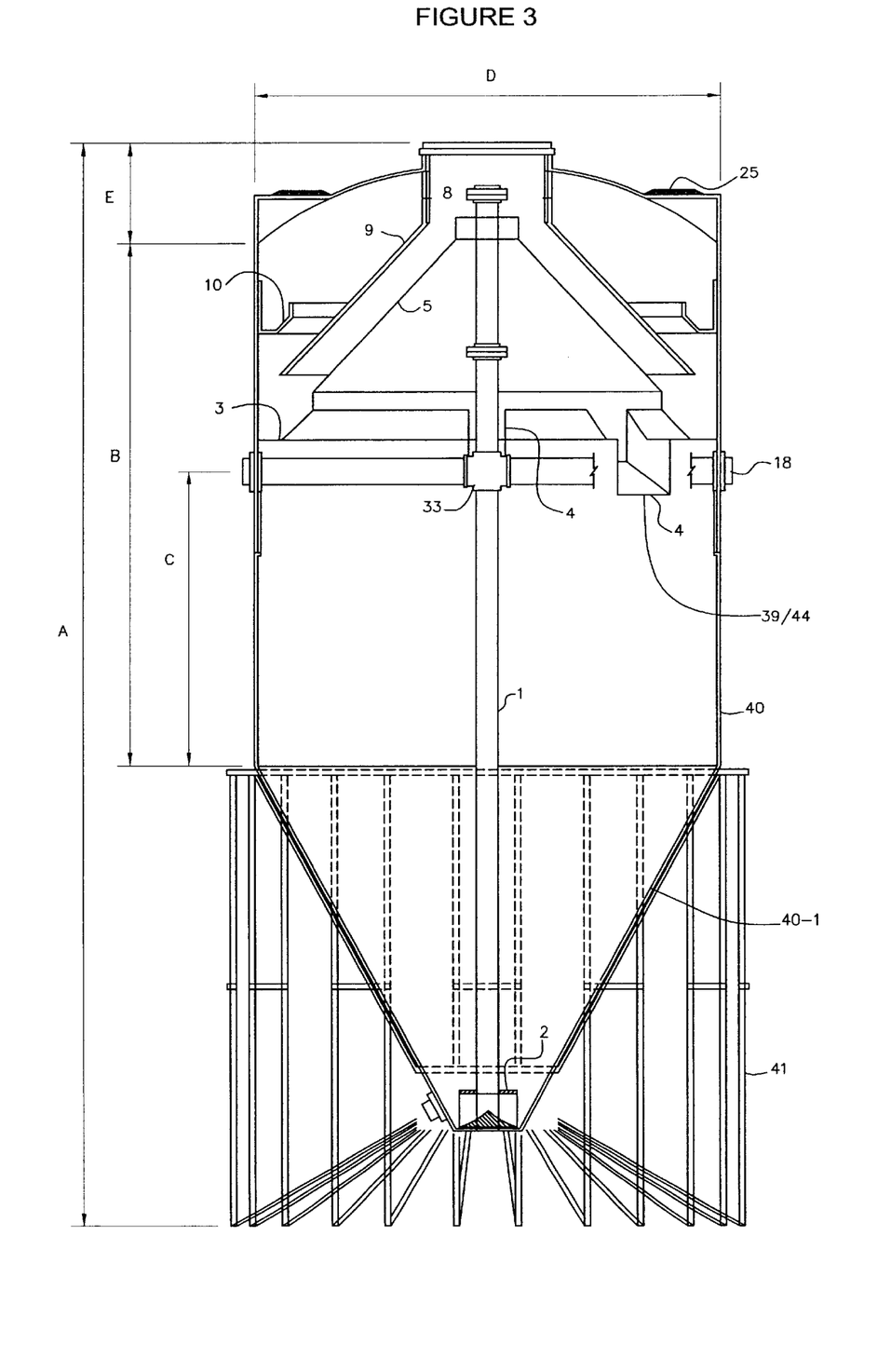
FIG. 3 shows sectional view B—B of the biological fluidized bed apparatus, wherein details of the return solids and waste solids collection boxes, as well as the incoming PVC line part of the recirculation and feed system, are shown.

B-B Cutting plane used for sections in FIG. 3

Figure 61:
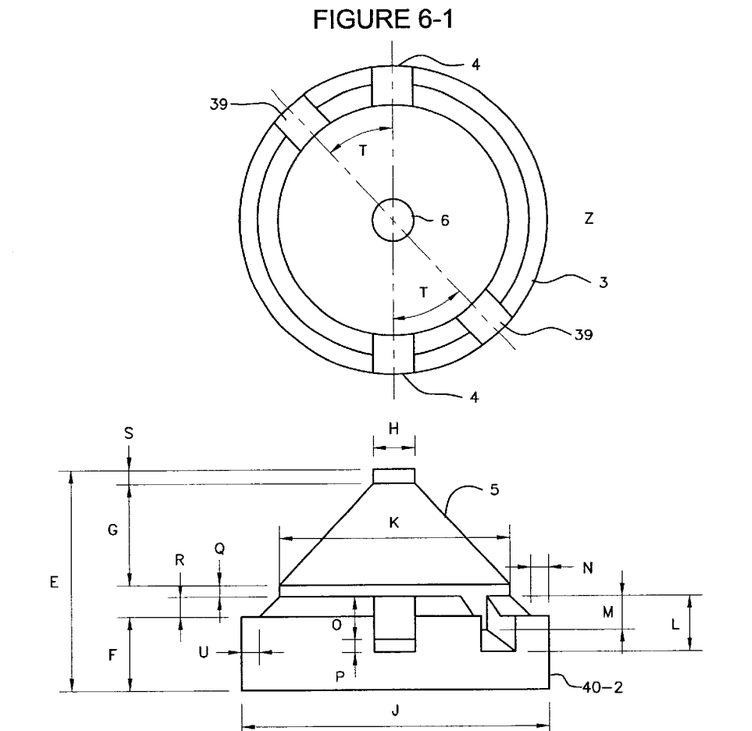

Z Orientation point for proper placement of component 6 in FIG. 6-1

Components

11 Effluent line connection (bulkhead fitting). Two locations

17 Recirculation line suction connection. Bulkhead fitting connects to suction of recirulation pump. Two locations 18 Recirculation line discharge connection. Bulkhead fitting connects to discharge of recirculation pump. Two locations 25 Access covers for reactor surface and effluent trough clean out. Access covers to upper portion of reactor. Four locations 35 Removable cover 40 Reactor tank, cylindrical middle portion 40-1 Reactor tank, conical bottom portion 43 Safety ladder 44 Excess solids wastage port (bulkhead fitting). Two locations FIG. 2. Sectional View A-A:

Dimensions

A 7848 mm

B 4166 mm

C 2997 mm

D 3556 mm

Components

1 Recirculation and feed flow discharge pipe

2 Flow distribution moulded fitting

5 Gas deflector, part of solids/gas/liquid separator

8 Gas storage chest

9 Recirculation flow deflector, part of solids/gas/liquid separator

10 Effluent trough

11 Effluent line connection (bulkhead fitting). Two locations

12 Surface skimmer arm

13 Solids collection paddle. Sweeps at low speed the solids collection trough

17 Recirculation line suction connection. Bulkhead fitting connects to suction of recirculation pump. Two locations 18 Recirculation line discharge connection. Bulkhead fitting connects to discharge of recirculation pump. Two locations 20 Motor-reducer unit to power solids paddle and surface skimmer 25 Access covers for reactor surface and effluent trough clean out. Access covers to upper portion of reactor. Four locations 27 Fluidized bed level. Media expands to this level when recirculation system is in operation 28 Settled media level. Media level without recirculation flow 33 PVC cross fitting with reducers. Part of flow recirculation system 40 Reactor tank, cylindrical middle portion 40-1 Reactor tank, conical bottom portion 41 Reactor tank metal base 41-1 Metal base shown partially for clarity of reactor details 43 Safety ladder FIG. 3. Sectional view B-B:
Dimensions
A 8788 mm
B 4725 mm
C 2997 mm
D 3556 mm
E 686 mm
Components
1 Recirculation and feed flow discharge pipe
2 Flow distribution moulded fitting
3 Carry-over solids collection trough
4 Return solids accumulation box. Two locations
5 Gas deflector, part of solids/gas/liquid separator
8 Gas storage chest
9 Recirculation flow deflector, part of solids/gas/liquid separator
10 Effluent trough
18 Recirculation line discharge connection. Bulkhead fitting connects to discharge of recirculation pump. Two locations.
25 Access covers for reactor surface and effluent trough clean out. Access covers to upper portion of reactor. Four locations.
39 Wastage solids accumulation and thickening box
40 Reactor tank, cylindrical middle portion
40-1 Reactor tank, conical bottom portion Reactor tank metal base
42 Excess solids wastage port, bulkhead fitting in box 39 not shown. Two locations FIG. 4. Sectional view A-A:
Components
1 Recirculation and feed flow discharge pipe
2 Flow distribution moulded fitting
3 Carry-over solids collection trough
4 Return solids accumulation box. Two locations
5 Gas deflector, part of solids/gas/liquid separator
6 Gas bubble-coalescence collar, part of solids/gas/liquid separator
7 Upflow clarification quiescent zone (sludge blanket to form in this section)
8 Gas storage chest
9 Recirculation flow detector, part of solids/gas/liquid separator
10 Effluent trough
11 Effluent line connection (bulkhead fitting). Two locations
12 Surface skimmer arm
13 Solids collection paddle. Sweeps at low speed the solids collection trough
14 Effluent launderer. Placed around effluent overflow weir
15 Scum and floatables collection box. One location
16 Scum and floatables wastage pipe connection (bulkhead fitting). One location
17 Recirculation line suction connection. Bulkhead fitting connects to suction of recirculation pump. Two locations
18 Recirculation line discharge connection. Bulkhead fitting connects to discharge of recirculation pump. Two locations
19 Effluent trough box. Accommodates effluent bulkhead fitting. Two locations
20 Motor-reducer unit to power solids paddle and surface skimmer
21 Power transmission mechanism. Splined shaft
22 Rotating arm connecting splined shaft to solids collection paddle
23 Gas release valve
24 Water level inside reactor
25 Access covers for reactor surface and effluent trough clean out. Access covers to upper portion reactor. Four locations
26 Support pipe for rotating mechanism of solids paddle and surface skimmer
27 Fluidized bed level. Media expands to this level when recirculation system is in operation
28 Settled media level. Media level without recirculation flow
29 Bulkhead fitting for media removal and emergency fluidisation with booster pump when bed becomes compacted
30 Arm driving surface skimmer. Connected to arm 22
31 Plastic rollers to support load of rotating arms. Rollers move in contact with upper surface of part 5
32 Blind flange and PVC reducer. Supports base pipe 26
33 PVC cross fitting with reducers. Part of flow recirculation system.
34 Effluent overflow weir
35 Removable cover
36 Internal weir for sludge blanket level control. Connection pipe and bulkhead fitting. One location
37 Down-flow passage of separator
38 Rotating hub with axial bearing. Driven by shaft 21
30 Arm driving surface skimmer. Connected to arm 22
40 Reactor tank, cylindrical middle portion
40-1 Reactor tank, conical bottom portion
41 Reactor tank metal base
41-1 Metal base shown partially for clarity of reactor details
42 Safety railing FIG. 5. Sectional view A-A:
Components
1 Recirculation and feed flow discharge pipe
2 Flow distribution moulded fitting
3 Carry-over solids collection trough
5 Gas deflector, part of solids/gas/liquid separator
9 Recirculation flow deflector, part of solids/gas/liquid separator
10 Effluent trough
18 Recirculation line discharge connection. Bulkhead fitting connects to discharge of recirculation pump. Two locations
33 PVC cross fitting with reducers. Part of flow recirculation system
40 Reactor tank, cylindrical middle portion
40-1 Reactor tank, conical bottom portion
41 Reactor tank metal base
41-1 Metal base shown partially for clarity of reactor details Description of operation 101 Recirculation and raw waste into reactor 102 Recirculation and raw waste flow into bottom of reactor 103 High velocity area for fluidisation of larger media particles 104 Low velocity area for fluidisation of finer media particles.

105 Fluidized bed level. Bed-liquid interface

106 Water, gas and suspended solids

107 Treated water overflow into solids separation zone

108 Downward flow deflector zone. Treated water with suspended solids flow into solids collection trough forced by suction of recirculation pump 109 Separated solids accumulate in trough. Solids collection paddle sweeps trough at low speed pushing solids into recirculation and wastage boxes.

110 Quiescent solids contact clarification zone. Solids separation by means of sludge blanket formed in this area 111 Treated effluent discharge port 112 Water level in solids separator 113 Water level in reactor dictated by height of effluent overflow weir 114 Recirculation port out of reactor. Bulkhead fitting connects to suction of recirculation pump. Treated water prior to solids separation exits reactor along with suspended solids and reenters at the bottom of the bed.

115 Contraction to enable coalescence of fine gas bubbles to enhance gas/liquid separation.

116 Gas storage volume. Gas is removed through valve 23.

FIG. 6-1. Detail of lower portion of solids separator and trough:

Cutting planes and orientation

Z Point of orientation for figure

Dimensions

E 2260 mm

F 686 mm

G 1092 mm

H 508 mm

J 3505 mm

K 2743 mm

L 660 mm

M 432 mm

N 178 mm

O 559 mm

P 102 mm

Q 127 mm

R 229 mm

S 152 mm

T 43 degree offset angle between centerlines of recirculation and solids wastage boxes.

U 178 mm

Components

3 Carry-over solids collection trough

4 Return solids accumulation box. Two locations

5 Gas deflector, part of solids/gas/liquid separator

6 Gas bubble-coalescence collar, part of solids/gas/liquid separator

39 Wastage solids accumulation and thickening box 40-2 Portion of cylindrical section of reactor tank to join with lip of part 40

Figure 62:
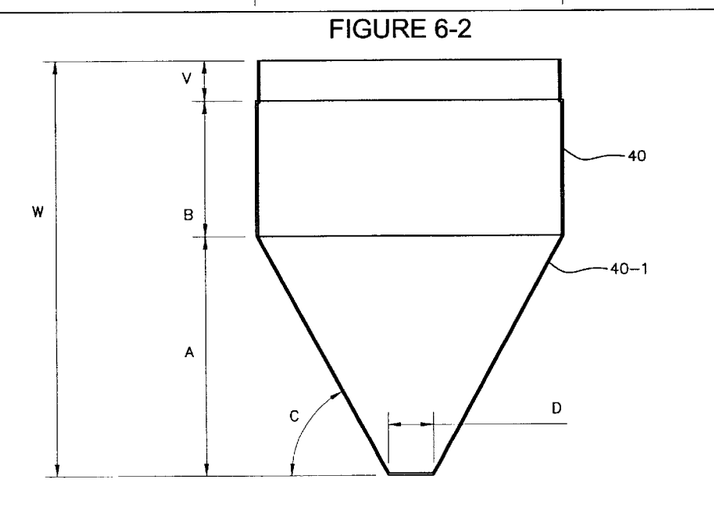

FIG. 6-2. Detail of conical bottom portion of reactor tank:

Dimensions

A 2692 mm

B 2413 mm

C Angle ranging from 30 to 80 degrees, most preferably 57 to 70 degrees

D 432 mm

V 152 mm

W 5258 mm

Components

Figure 71:
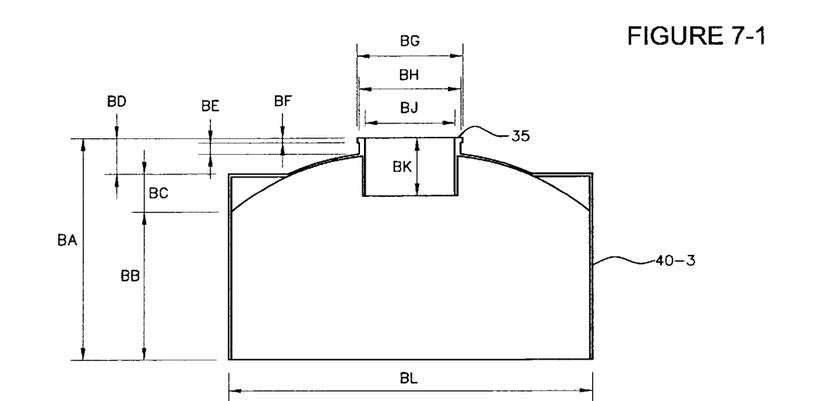

40 Reactor tank, cylindrical middle portion 40-1 Reactor tank, conical bottom portion FIG. 7-1. Detail of upper cylindrical portion of reactor tank:

Dimensions

BA 2870 mm

BB 2286 mm

BC 254 mm

BD 330 mm

BE 127 mm

BF 25 mm

BG 1194 mm

BH 1041 mm

BJ 914 mm

BK 457 mm

BL 3556 mm

Components

35 Removable cover 40-3 Upper cylindrical portion of reactor tank

Figure 72:
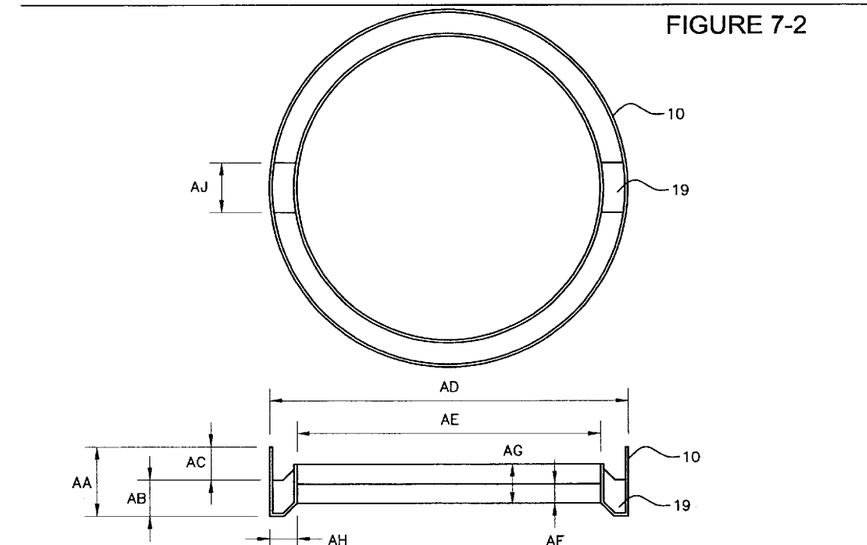
Figure 73:
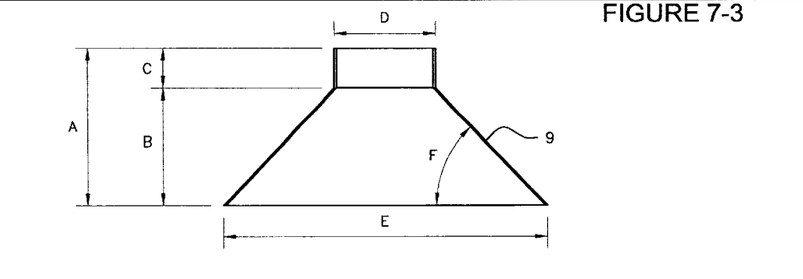

FIG. 7-2. Detail of effluent weir and trough:

Dimensions

AA 660 mm

AB 330 mm

AC 330 mm

AD 3505 mm

AE 2997 mm

AG 254 mm

AF 127 mm

AJ 508 mm

Components

10 Effluent trough

19 Effluent trough box. Accomodates effluent bulkhead fitting. Two locations

FIG. 7-2. Detail of effluent weir and trough:

Dimensions

A 1346 mm

B 1067 mm

C 279 mm

D 965 mm

E 3100 mm

F 45 degree angle

Components

9 Recirculation flow deflector, part of solids/gas/liquid separator

Figure 8:
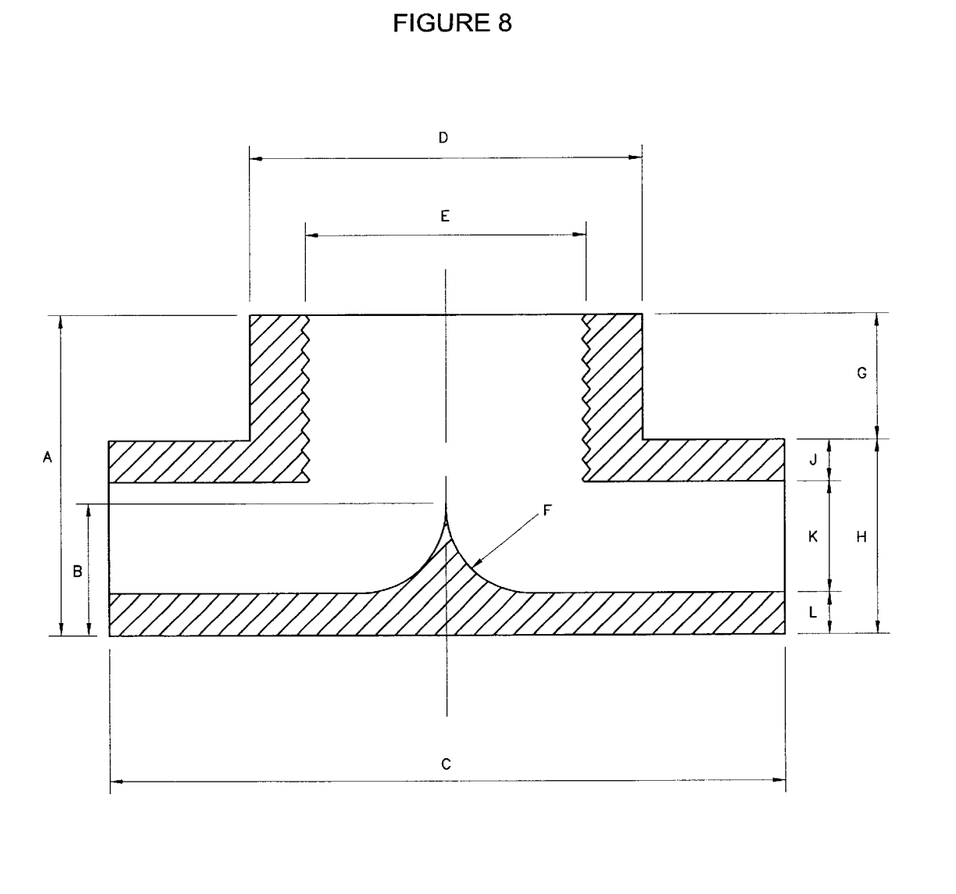
FIG. 8 is a fabrication drawing that shows the moulded flow distribution fitting.

FIG. 8. Detail of flow distribution moulded fitting:

Dimensions

A 146 mm

B 60 mm

C 356 mm

D 203 mm

E 150 mm pipe thread

F Radius of 50 mm

G 57 mm

H 89 mm

J 19 mm

K 51 mm

L 19 mm

Figure 9:
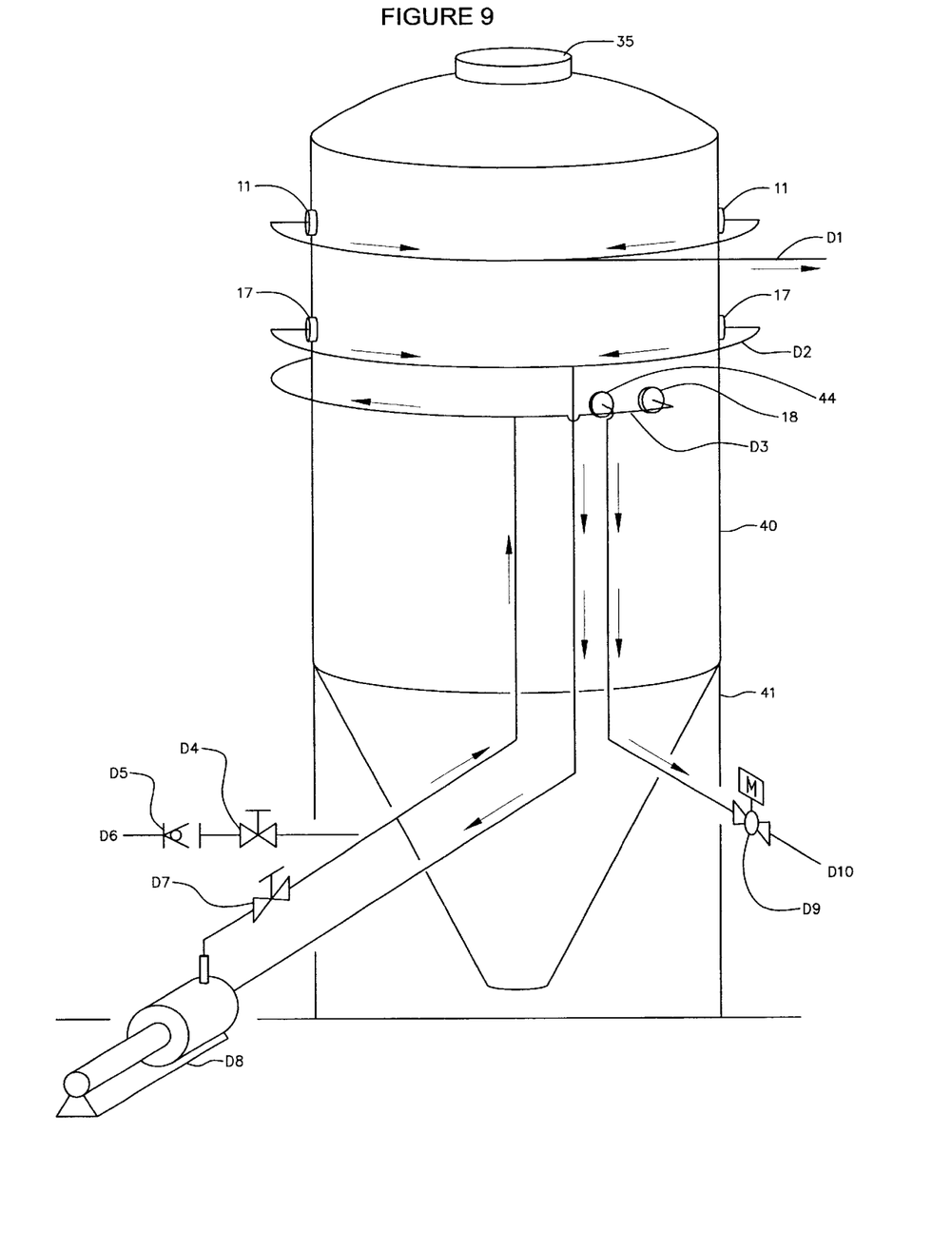
FIG. 9 is an isometric sketch of an installed biological fluidized bed apparatus, wherein basic piping, recirculation pump, and wastewater feed connections are depicted.

FIG. 9. Isometric view of reactor with external piping:

External Components

D1 Treated effluent discharge line

D2 Recirculation water out of reactor to suction of recirculation pump

D3 Recirculation water into reactor, discharged by recirculation pump

D4 Wastewater feed isolating valve

D5 Wastewater feed check valve

D6 Wastewater feed

D7 Recirculation flow control valve

D8 Recirculation pump

D9 Solids wastage motorised valve operated on timer

D10 Wasted solids storage and processing

Components

11 Effluent line connection (bulkhead fitting). Two locations

17 Recirculation line suction connection. Bulkhead fitting connects to suction of recirculation pump. Two locations 18 Recirculation line discharge connection. Bulkhead fitting connects to discharge of recirculation pump. Two locations 35 Removable cover 40 Reactor tank, cylindrical middle portion 41 Reactor tank metal base 44 Excess solids wastage port. Bulkhead fitting placed in box 39. Two locations

4. DESCRIPTION AND OPERATION OF THE PREFERRED EMBODIMENT (FIGS. 1–9)

The biological fluidized bed apparatus depicted in the figures is a modular, prefabricated reactor. The dimensions shown in FIG. 2 correspond to the largest unit, for example, that can be pre-fabricated and transported from the manufacturing facility to the project site. The dimensions in FIG. 2 and other figures are for reference only. Reactors of any size can be manufactured maintaining proportional dimensions as shown in the figures.

Projects that require larger treatment volume should use two or more units connected in parallel or in series, depending on the application.

A typical embodiment of the biological fluidized bed apparatus is illustrated in FIG. 2. This drawing shows part of the reactor base, access ladder and safety railing at the top of the unit. Although the reactor design presented in the drawings was developed for low-density linear polyethylene, it can be fabricated in carbon steel plate, stainless steel or fiberglass, or other suitable materials.

Since the present invention focuses on the design and configuration of an optimized biological fluidized bed apparatus, details regarding start-up, operation and biological and hydraulic design parameters will not be given here.

The apparatus has an enclosed conical bottom circular tank supported by a steel stand. The tank has an upper cylindrical portion and a lower conical portion. The conical portion of the reactor rests on a conical shape carbon steel plate, to which 12 legs are welded. The reactor is filled with water and an inert media bio-carrier. Preferred media particle sizes are 400 to 600 micrometers (ASTM Mesh 30×40) and particle specific gravity of 1.4 as in activated carbon, to 2.2 as in zeolite. Before the particles are colonized by bacterial biofilm, the settled media reaches a level (28) in the cylindrical portion of the tank. A recirculation pump draws water from the upper portion of the tank, passed a solids/gas/liquid separator device, and pumps it back into the bottom of the tank. The upflow velocity provided by the recirculation flow increases the porosity of the media and fluidizes the bed. The fluidized bed reaches a higher level (27), which is equivalent to an empty bed volume increase of 20 to 30 percent with respect to the original settled bed volume. The degree of the volume increase depends on the pump's flow rate.

During start-up of the apparatus, bacterial seed, consumable substrate, macro-nutrients and micro-nutrients are supplied. Biofilm grows attached to each media particle to a thickness ranging between 100 and 200 micrometers. The thickness of the biofilm depends on the initial concentration of the substrate treated in the apparatus, the type of bacteria (i.e., pure acetogenic, methanogenic or denitrifying), and the intensity of the attrition between particles in the bed. The density of the biofilm is only slightly higher than the density of water. As a result, since the inert particle experiences an increase in volume without a significant increase in weight, the specific gravity of the bio-particle as a whole is reduced. This enables the colonized bed to be fluidized with lower upflow velocities than the original bare-particle bed. Additionally, at the same bed porosity, the fluidized empty bed volume increases due to biofilm thickness.

Water level inside the apparatus (24) is determined by the location of the overflow weir (34) in the effluent trough (10). In order to start-up the reactor, anaerobic bacteria or denitrifying bacteria are seeded into the unit. Raw waste is fed into the recirculation line (see FIG. 9). The wastewater fed into the line flows out of the reactor over the effluent weir (34), after being treated.

From the bottom of the tank to the collar that causes gas bubbles to coalesce (6), upflow velocity is controlled by the flow rate provided by the recirculation pump and the cross-sectional area at each level of the tank. A ball valve at the discharge of the recirculation pump controls the flow rate through the recirculation system (see FIG. 9). Recirculation flow is maintained constant at a rate sufficient to achieve the desired fluidization of the media (e.g., bed porosity) in the cylindrical portion of the tank.

Recirculating water is suctioned from the return solids accumulation boxes (4) through two bulkhead fittings (17), which are piped to the suction port of the recirculation pump. The discharge of the pump is piped to two bulkhead fittings (18). An internal horizontal pipe connects both bulkhead fittings (18) to a PVC cross fitting (33). The cross fitting directs the flow downward through a vertical pipe (1). The down-coming pipe (1) ends in a molded flow distribution fitting (2). This fitting, which rests at the bottom of the tank, has internal contoured surfaces. In the fitting, the direction of the flow changes 90 degrees, so that it exits radially at the bottom of the cone. Details of this fitting are presented in FIG. 8.

The opening at the perimeter of the flow distribution fitting is such that at the lowest recirculation flow-rate, sufficient radial exit velocity is attained to carry (erode) media particles located at the bottom of the tank, around the fitting. Minimum exit velocity for 30×40 mesh activated carbon media should be 0.6 m/s. For 30×40 mesh zeolite media the minimum exit velocity should be 1.2 m/s. Appropriate upflow velocity in the cylindrical portion of the reactor depends on the type and size of media used and the desired overall bed porosity. For activated carbon media, 30×40 mesh, adequate upflow velocity in the cylindrical portion of the reactor is in the order of 8 to 12 meters per hour. For zeolite media, 30×40 mesh, the velocity should be between 15 and 20 meters per hour. In a reactor with the dimensions shown in the figures, the upflow velocity required to fluidize a bed with activated carbon media 30×40 mesh, can be obtained with 30 to 40 liters per second (e.g., 500 to 600 gallons per minute) of recirculation flow rate.

Above the recirculation outflow ports (17), there is no effect of the recirculation flow. Accordingly, between these ports and the effluent overflow weir, the upflow velocity is much lower. The upflow velocity in this portion of the apparatus is determined by the feeding flow rate of the waste being treated. Normally, for industrial or animal waste, the ratio of recirculation to feed flow ranges from 30/1 to 10/1. A quiescent zone with no gas interference is provided in the upper portion of the tank (7), external to the separator (9). In this zone, the upflow velocity decreases gradually as it approaches the effluent weir. The reducing velocity causes suspended solids to settle, thus providing effluent clarification. A suspended sludge blanket typically forms in this portion of the tank. This blanket provides further removal of solids by solids contact clarification. In order to control the level of the sludge blanket, a submerged solids overflow weir is provided (36). An electrically actuated PVC ball valve opens on a timer sequence, to withdraw solids reaching above the submerged weir level. These solids are wasted. By keeping the sludge blanket level at a controlled height, sufficient clarification depth is allowed above the sludge-water interface.

As shown in FIG. 9, the biological fluidized bed apparatus works with a closed-loop recirculation system. Untreated wastewater is pumped into the recirculation pump discharge pipe (FIG. 9) where it mixes with partially treated recirculation water withdrawn from two ports (17) in the mid-upper portion of the reactor. The mixture enters the reactor (18) and flows downward through the drop pipe (1) and exits radially through the flow distribution molded fitting (2). This vertical pipe (1) is submerged in media. By the action of the upflow velocity created by the recirculation flow, the media bed will expand (28) and (27).

Above the expanded bed level (27), intense bubbling occurs, as biogas (in the case of methanogenic reactors) or nitrogen gas (in the case of anoxic denitrifying reactors) is generated and released from the bed. The significant external porosity of the fluidized bed (usually 60 to 70 percent) allows gas bubbles to be release rapidly from them bed. The advantage of maintaining such high bed porosities is that coalescence of fine bubbles into larger bubbles inside the bed is minimized. If gas is trapped inside the bed, larger bubbles form by coalescence. Due to their increased buoyancy, larger bubbles emerge through the bed at high velocities and disrupt the bed. Solids that are entrapped in the bed are released by the disturbance, thus increasing suspended solids carry over.

Gas bubbles emerging from the fluidized bed rise through the water. Bubbles rising along the periphery of the bed are deflected to the center of the tank by the sloped bottom of the solids trough (3). The solids trough continues upward into the sloped lower wall of the separator (5). This conical shaped wall ends in a short cylindrical collar (6). Due to the shape of the lower separator wall (5), the section through which the flow needs to pass is reduced. The reduction in cross-section forces the fine gas bubbles traveling in the flow to coalesce. Larger coalesced bubbles formed are released from the water at high velocity through the collar, into the gas space (8) above the water level. Gas is removed from the reactor through a valve (23). The diameter of the separator collar is such that at the recirculation flows required to fluidize the bed, the water emerges at 0.15 to 0.2 m/s. Water spills over the collar and falls into the downflow passage of the separator (37), formed by the lower (5) and upper (9) sloped walls of the separator. Water flows down the sloped passage and exits at a velocity of approximately 0.015 m/s into the solids trough (3). Once it reaches the trough, it moves toward the two diametrically opposed recirculation suction bulkhead fittings (17), located inside the solids return boxes (4). The bulkhead fittings are connected to the suction of the recirculation pump.

Above the solids trough (3), the flow that continues ascending to the effluent overflow weir is only the wastewater feed flow. That flow is extremely low (1/10 to 1/30 of the recirculation flow, depending on the strength of the wastewater). Suspended solids carried in the full flow descending along the sloped down-flow passage of the solids separator hit the solids trough and most of them remain in the trough. There is no sufficient upflow velocity above the level of the trough to carry large solids to the surface of the tank. Ascending flow has to go through the clarification zone (7) to reach the effluent weir. The upflow velocity at the bottom of the clarification zone is 3 m/h, and it decreases to 1.2 m/h as it approaches the effluent weir. As explained above, the solids that are dragged by this low upflow velocity create a sludge blanket as the upflow velocity in this zone decreases. The sludge blanket enhances suspended solids removal by solids contact clarification.

A solids collection paddle (13) pushes the larger solids that remain in the solids trough (3) into solids collection boxes (4). The solids trough has a total of 4 collection boxes. Two boxes collect solids to be returned into the bed by the recirculation pump, and two other boxes collect solids to be wasted. The four boxes are placed in such a way that most of the solids settling in the solids trough are pushed into the solids return boxes. Electrically actuated ball valves, placed in the two solids wastage boxes and operated on a timed sequence, remove the solids accumulated in these boxes. Solids wastage boxes (39) are shown in FIGS. 3 and 6-1. The solids wastage port (44) is shown in FIGS. 1 and 3. Tip speed of the solids accumulation paddle is 10 feet/min. A motor/gear reducer drive (20) turning at 0.25 RPM provides the mechanical energy. The drive is mounted externally on the cover plate of the tank (35). A driving shaft (21) with a positive drive mechanism locks with a free rotating hub (38), furnished with axial bearings. An arm (22) connects the hub with the paddle (13). The arm rests on two sets of plastic rollers (31). The rollers move along the external surface of the lower cone of the separator (5).

At the surface of the water inside the tank (24), scum and other floatables passing the separator and the quiescent clarification zone, may accumulate and form a crust. An effluent launderer baffle placed along the effluent weir (14) avoids floating solids to exit the reactor over the weir. A surface skimmer (12) rotates along with the solids accumulation paddle. The skimmer is driven by a connecting arm (30), which is bolted to the frame of the paddle. This arm also rests on two sets of rollers. These rollers slide on the external surface of the upper cone of the separator (9). The skimmer pushes floating material into a scum box (15). The floating material collected in this box is removed by gravity through a bulkhead fitting (16). An electrically actuated valve, operating on a timed sequence, opens and empties this box.

In order to exit the apparatus, the effluent has to flow under the launderer and over the effluent weir (34) into the effluent trough (10). Two effluent ports with bulkhead fittings are provided (11). To assure that the effluent trough is emptied completely, these bulkhead fittings are placed inside two depressions (19) provided in the trough.

With the biological fluidized bed apparatus, as described above, the disadvantages of existing patented fluidized bed reactor configurations are greatly overcome. This design provides cleaner effluents and offers a more reliable operation. This compact wastewater treatment apparatus could favorably replace other high-energy consuming treatment technologies.

We claim:

1. A biological fluidized bed apparatus for the treatment of wastewater comprising:

a reactor tank having a 60 degree conical bottom;

a media bed within said tank;

a recirculation pipe within said tank having an upper inlet, and a lower conformed outlet fitting within said media;

a solids collection trough located above said media bed, said trough having a solids thickening means and a sloped bottom for deflecting gas bubbles to the center of the tank;

a conical solids/gas/liquid separation means disposed above the said solids trough, said conical separation means having an upper and a lower cone creating a down-flow compartment to direct suspended solids into said solids trough;

a quiescent zone forming a sludge blanket clarification means within said tank external to said conical separation means, said quiescent zone having a treated effluent weir, a rotating surface skimmer and a scum collection means;

a recirculation outflow port within said solids trough, in the mid-upper part of the said tank;

a pump for withdrawing water from the said recirculation outflow port; said pump having a discharge pipe connected to said recirculation pipe inlet, forming a means for fluidizing the said media bed; and a means for introducing untreated wastewater into said pump discharge pipe.

* * * * *